United States Patent [19]
Isshiki

[11] Patent Number: 5,867,306
[45] Date of Patent: Feb. 2, 1999

[54] OPTICAL AMPLIFIER

[75] Inventor: Kunihiko Isshiki, Tokyo, Japan

[73] Assignee: Mitsubishi Denki Kabushiki Kaisha, Tokyo, Japan

[21] Appl. No.: 878,816

[22] Filed: Jun. 19, 1997

[30] Foreign Application Priority Data

Dec. 27, 1996 [JP] Japan ................................ 8-350110

[51] Int. Cl.⁶ .......................................... H01S 3/00
[52] U.S. Cl. ............................................. 359/341
[58] Field of Search .............................. 359/341, 134, 359/160

[56] References Cited

U.S. PATENT DOCUMENTS

| | | |
|---|---|---|
| 5,181,264 | 1/1993 | Chiaretti et al. . |
| 5,557,442 | 9/1996 | Huber . |
| 5,598,294 | 1/1997 | Uno et al. ................................. 359/341 |
| 5,623,362 | 4/1997 | Mitsuda et al. .......................... 354/349 |

OTHER PUBLICATIONS

Tkach, "Gain–flattened optical–fiber amplifiers with a hybrid er–doped–fiber configuration for WDM transmission," Technical Digest OFC '95, pp. 77–78.

Koji, et al, English–language abstract of Japanese laid–open application JP–A–7–226560.

Makoto, et al, English–language abstract of Japanese laid–open application JP–A–7–211980.

Tadashi, et al, English–language abstract of Japanese laid–open application JP–A–6–324368.

Kashiwada, et al, "Study on optical fiber amplifier for WDM transmission system employing hybrid EDF configuration," 1995.

Takano, et al "An optical Pre–Amplifier with Automatic Gain Control Function," 1995.

"Optical amplifier and its application".

Primary Examiner—Mark Hellner

[57] ABSTRACT

An efficient, wavelength independent, small optical amplifier includes an optical transmitter, a signal light inputter supplying light to the optical transmitter, an amplified light fiber connected to the optical transmitter, an excitation source supplying pump light to the light amplified fiber, an optical filter connected between the light amplified fiber and the excitation source for reflecting the signal light and transmitting the pump light, and an outputter for outputting the amplified signal light. The amplifier may also include another light amplified fiber connected to the optical transmitter, another excitation source, and another optical filter for further amplifying the signal light amplified by the light amplified fiber. The wavelengths output by the excitation sources may differ to provide more efficient amplification. The signal light may include different wavelengths, resulting in a wavelength dependency of gain for the amplifier. In order to compensate for this wavelength dependency, the material, the length, the dopant level, and/or the core diameter used for the light amplified fibers may differ, again the wavelength of the excitation sources may differ, and the optical filters may only pass different certain wavelengths. Portions fed by the respective terminal may be integrated to reduce the number of elements and size of the amplifier.

15 Claims, 13 Drawing Sheets

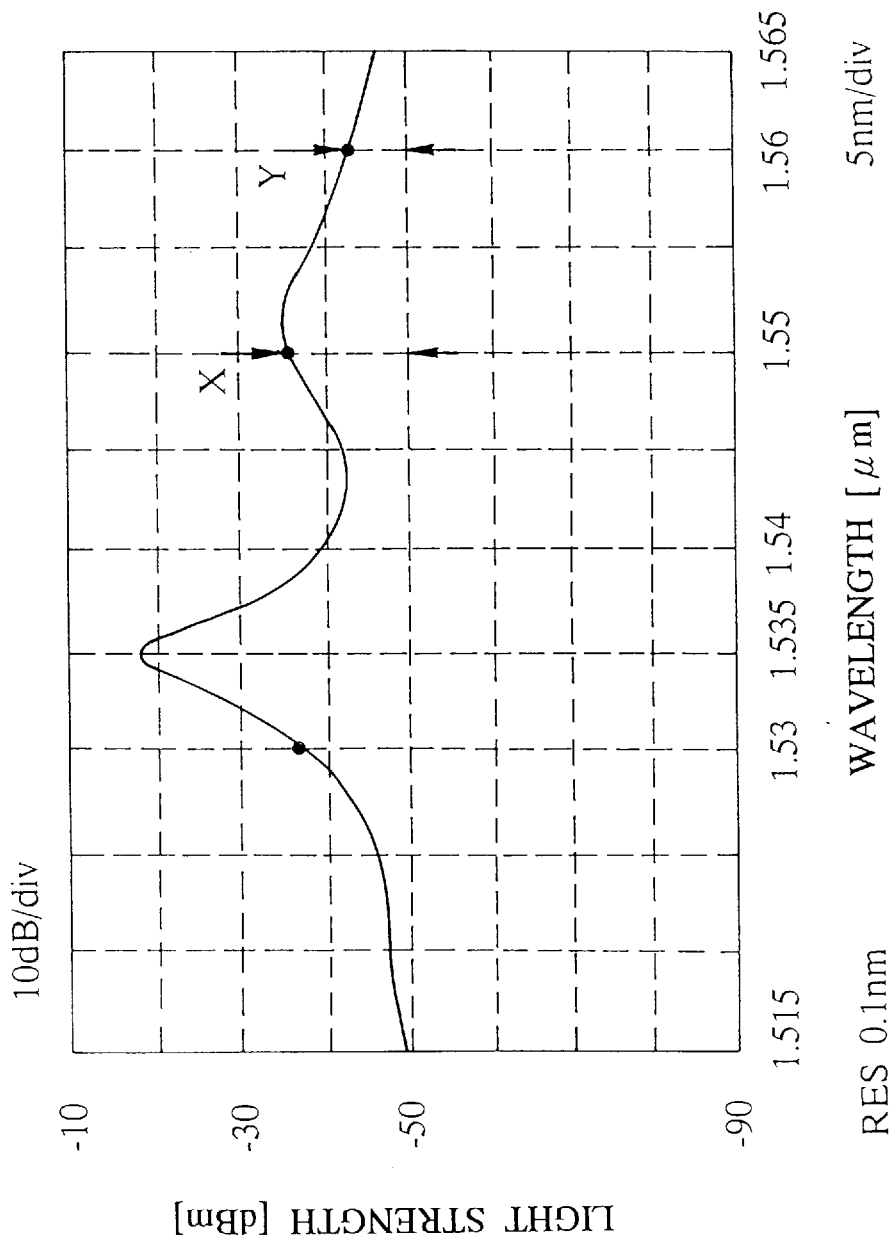

5,867,306

OPTICAL AMPLIFIER

BACKGROUND OF THE INVENTION

1. Field of the Invention

This invention relates to an optical amplifier used, for example, in an optical fiber communication system. Specifically, this invention relates to a reflection type of optical fiber amplifier using an optical circulator.

2. Description of the Related Art

Related Art 1

FIG. 9 shows a configuration of a conventional optical amplifier as disclosed in Japanese Unexamined Patent Publication No. HEI 6-324368.

In FIG. 9, an optical circulator 1, which is an optical transmission device, has input/output terminals 1a to 1d. The input/output terminal 1a connects an optical fiber 5a, which is a signal light input. The input/output terminal 1b connects an optical fiber 51. The input/output terminal 1c connects an optical fiber 52. The input/output terminal 1d connects an optical fiber 5b, which is a signal light output. The optical fiber 51 connects an erbium-doped optical fiber (referred to as EDF, hereinafter) 2a, which is the first light amplification fiber, and an optical filter 3a made of dielectric multilayer film, which is the first optical filter and a semiconductor laser module (referred to as LD/M, hereinafter) 4a for generating 0.98 μm pump light, which is the first pump light source. The optical fiber 52 connects an EDF 2b, which is the second light amplification fiber, and an optical filter 3b made of dielectric multilayer film, which is the second optical filter, and an LD/M 4b, which is the second pump light source.

Next, the operation of the optical amplifier of FIG. 9 will be described. A pump light, whose wavelength is 0.98 μm, is output from the LD/M 4a and input to the EDF 2a through the optical fiber 51 and the optical filter 3a. Then, the pump light of 0.98 μm leads erbium ions in the EDF 2a to an excited state and light amplification operation for the light of 1.5 μm band is performed in the EDF 2a. Likewise, a pump light, whose wavelength is 0.98 μm, is output from the LD/M 4b and input to the EDF 2b through the optical fiber 52 and the optical filter 3b. Then, the pump light of 0.98 μm leads erbium ions in the EDF 2b to an excitation state and light amplification operation for the light of 1.5 μm band is performed in the EDF 2b.

For example, a signal light, whose wavelength is 1.55 μm, is input to the optical circulator 1 through the optical fiber 5a and the terminal 1a. Then, a signal light, whose wavelength is 1.55 μm, is output from the terminal 1b and passes the EDF 2a through the optical fiber 51. The signal light is amplified by passing the EDF 2a. After that, the signal light is reflected by the optical filter 3a and amplified again by reversing the EDF 2a. Consequently, the signal light is again input to the circulator 1 from the terminal 1b. Then, the amplified signal light is output from the terminal 1c and amplified by going through the EDF 2b, the optical filter 3b, the EDF 2b, and the terminal 1c orderly as stated before. The amplified signal is output from the terminal 1b to the optical fiber 5b. The optical circulator transmits light between terminals in a specific direction such as from 1a to 1b, from 1b to 1c, from 1c to 1d and from 1d to 1a. However, between the terminals in the other directions, the light is not substantially transmitted. In addition, there is an optical circulator having three terminals and a configuration where only one EDF is used is known.

Related Art 2

According to a "Discussion of optical fiber amplifier for WDM electrical transmission system using a B-1099 hybrid EDF" by Tomonori Kashiwada and the other five people in the general meeting of the Institute of Electronics Information and Communication Engineers in 1995, it is reported that a hybrid EDF which is a cascade connection of P-Al(P stands for phosphorus, Al stands for aluminum)-codoped EDF and Al(Al stands for aluminum)-doped EDF can make gain flat, in a wide wavelength range whose signal wavelength is from 1543 to 1558 nm without degrading amplification efficiency, comparing to the Al-doped EDF simple alone.

FIG. 10 shows an output spectrum of the hybrid EDF in cascade connection of P-Al-codoped EDF and Al-doped EDF. The Hybrid EDF of FIG. 10 inputs a signal light from the side of P-Al-codoped EDF and inputs a pump light from the side of Al-doped EDF. For the spectrum in FIG. 10 showing gain as a function of wavelength, the total input signal light is −15 dBm and the excitation wavelength is 1.47 μm. FIG. 10 shows a slope θ of gain obtained from the output spectrum whose signal light wavelength is 1543, 1548, 1552, and 1558 nm. Each gain is almost the same and the slope θ is close to zero.

FIG. 11 shows an output spectrum at a simultaneous amplification of four waves (1543/1548/1552/1558 nm) by Al-doped EDF under the same conditions for FIG. 10. In FIG. 11, a slope α of gain from the output spectral whose signal light wavelength is 1543, 1548, 1552 and 1558 nm is shown.

FIG. 12 shows an output spectrum at a simultaneous amplification of four waves (1543/1548/1552/1558 nm) by P-Al-codoped EDF under the same conditions of FIG. 10. In FIG. 12, a slope β of gain from the output spectral whose signal light wavelength is 1543, 1548, 1552 and 1558 nm is shown.

In FIG. 11, the gain of the signal light on the longer wavelength is higher and a maximum of difference of gain between the four waves is about 3 dB. In FIG. 12, by using P-Al-codoped EDF, a contrary amplification characteristic to Al-codoped EDF can be obtained when a wavelength is from 1.54 to 1.56 μm.

When cascade connection of P-Al-codoped and Al-doped EDF is configured, the slope α of gain for the wavelength by Al-doped EDF and the slope β of gain for the wavelength by P-Al-codoped EDF are offset each other. Therefore, as shown in FIG. 10, the slope becomes θ and wavelength dependency of gain disappears. FIG. 13 shows wavelength dependency of output at the time of a simultaneous amplification of four waves. In FIGS. 10 and 13, the total output power of the hybrid EDF is +14.2 dBm, which is almost equal to that of Al-doped EDF of 22 m in length. However, a maximum difference of gain between four waves by hybrid EDF is 1.3 dB and this value (1.3 dB) almost corresponds to that of Al-doped EDF of 13 m in length.

Related Art 3

According to "B-1067 optical preamplifier having auto gain control function" by Katsumi Takano and the other four people in the general meeting of the Institute of Electronics Information and Communication Engineers in 1995, a cascade connected 0.98/1.48 μm coexcitation type of optical fiber amplifier is explained. FIG. 14 shows a configuration of an optical preamplifier. In FIG. 14, the former EDF 900 performs 0.98 μm (980 nm) forward excitation in order to reduce noise. The latter EDF 901 performs 1.48 μm (1480 nm) backward excitation. The former EDF 900 is 12 m in length and the back step EDF 901 is 40 m in length. An Automatic Gain Control (AGC) circuit 902 controls outputs of a 980 nm Laser Diode (LD) and a 1480 nm LD in order to make data amplitude of a receiving circuit stable.

Related Art 4

On page 180 of "Optical amplifier and its application" published by Ohmu-sha, a laser module using the non-spherical lens is shown. The laser module using the non-spherical lens as shown in FIG. 15 has a case 910 fixing the non-spherical lens 914 inside and a package putting a laser 915 inside. The case and the package are fixed by welding and integrated.

In an optical amplifier using an optical circulator as shown in Related Art 1, one optical circulator has input/output terminals for the optical amplifier and prevents reversing of lights and has a function for providing a stable amplification operation. Therefore, a simplified configuration can be enabled by using a fewer number of elements. According to an excitation by 0.98 $\mu$m pump light, as known, three-level of excitation is enabled, and a low noise characteristic can be realized. Further, energy conversion efficiency of a pump light and a signal light is calculated according to ratio of each wavelength of the light. In Japanese Unexamined Patent Publication No. HEI 6-324368, as above stated, the wavelength of the signal light is 1.55 $\mu$m. Therefore, energy conversion efficiency is 0.98/1.55=0.63. That is, there is a problem that the energy conversion efficiency cannot be more than 63% in principle.

The EDF 2a and the EDF 2b as shown in Related Art 1 provides light amplification operation of wavelength range, from about 1.52 to 1.58 $\mu$m. However, amplification rate, that is, a gain depends on the wavelength of the signal light. FIG. 16 shows ASE (Amplified Spontaneous Emission) spectral in erbium-diffused optical fiber where erbium is diffused in pure silica ($SiO_2$) core (FIG. 16 shows a figure on page 115 of "Optical amplifier and its application" published by Ohmu-sya). FIG. 16 shows a light strength (hereinafter, referred to as power) to a signal light whose wavelength is from 1.515 $\mu$m to 1.565 $\mu$m according to a 0.98 $\mu$m pump light. In FIG. 16, the power has peaks at the wavelength of 1.536 $\mu$m and 1.552 $\mu$m. On the other hand, the power is at least at wavelength of 1.515 $\mu$m in the figure. Then, the difference of the power between the wavelength of 1.536 $\mu$m and that of 1.515 $\mu$m is almost 30 dB.

Therefore, when a plurality of signal lights of different wavelengths are input, an unbalance in the power of each output signal light results.

As a hybrid EDF, a hybrid EDF which has cascade connection of P-Al-codoped EDF and Al-doped EDF was described. However, there is a problem that adjustment of length of EDF is required so that a slope of gain by P-Al-codoped EDF and a slope of gain by Al-doped EDF can be offset.

In a cascade-connected 0.98/1.48 $\mu$m coexcitation type of optical fiber amplifier in Related Art 3, high output is realized according to 1.48 $\mu$m backward excitation. However, since excitation power is limited, fiber length for gaining a maximum gain should be lengthened. When the fiber length is lengthened, there causes a problem that an optical fiber amplifier should be large in scale.

SUMMARY OF THE PRESENT INVENTION

The present invention is made to solve these and other problems. It is an object of the present invention to obtain an optical amplifier to improve energy conversion efficiency. Further, it is an object of the present invention to obtain an optical amplifier to make the wavelength dependency of gain small. Further, it is an object of the present invention to obtain a small optical amplifier.

An optical amplifier in the present invention comprises:

(a) an optical transmitter having a first, a second, a third and a fourth terminals, and for transmitting light between each of the terminals;

(b) a signal light inputter, connected to the first terminal of the optical transmitter, for supplying signal light;

(c) a first light amplified fiber, connected to the second terminal of the optical transmitter, for amplifying the signal light input supplied from the signal light inputter;

(d) a first pump light source for supplying a first pump light having a first wavelength to the first light amplified fiber;

(e) a first optical filter, connected between the first light amplified fiber and the first pump light source, for reflecting the signal light and passing the pump light;

(f) a second amplified fiber, connected to the third terminal of the optical transmitter, for further amplifying the signal light amplified by the first light amplified fiber;

(g) a second pump light source for supplying a second pump light having a second wavelength different from the first excitation wavelength to the second light amplified fiber;

(h) a second optical filter, connected between the second light amplified fiber and the second pump light source, for reflecting the signal light and passing the pump light; and (i) a signal light outputter, connected to the fourth terminal of the optical transmitter, for outputting the signal light.

In the optical amplifier of the invention, the signal light includes light having different wavelengths and wavelength dependency of gain obtained by amplifying the signal light with the first light amplified fiber and wavelength dependency of gain obtained by amplifying the signal light with the second light amplified fiber are compensated so that gain spectrum is made flat.

In the optical amplifier of the invention, the signal light includes a first signal light and a second signal light having different wavelengths, and the optical amplifier further comprises a third optical filter connected between the second terminal of the optical transmitter and first light amplified fiber for transmitting the first signal light.

The optical amplifier further comprises a fourth optical filter, connected between the third terminal of the optical transmitter and the second light amplified fiber, for passing the second signal light when the third optical filter passes the first signal light.

An optical amplifier in the present invention comprises:
an optical transmitter having at least a first, a second and a third terminal and for transmitting the signal light between each of the terminals;
a signal light inputter, connected to the first terminal, for supplying signal light;
a light amplified fiber, connected to the second terminal, for inputting, amplifying and outputting the signal light;
a pump light source for generating a pump light to supply the optical amplifier; and
a light connecting part for connecting the generated pump light on the light amplified fiber; and
an optical filter, connected between the light amplified fiber and the light connecting part, for reflecting the signal light and for passing the pump light;
wherein at least two of the optical filter, the light connecting part, and the pump light source are integrated.

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein:

FIG. 16 shows an ASE spectral in erbium-doped optical fiber in which erbium is added on silica core.

DETAILED DESCRIPTION

Embodiment 1

Figure 1:
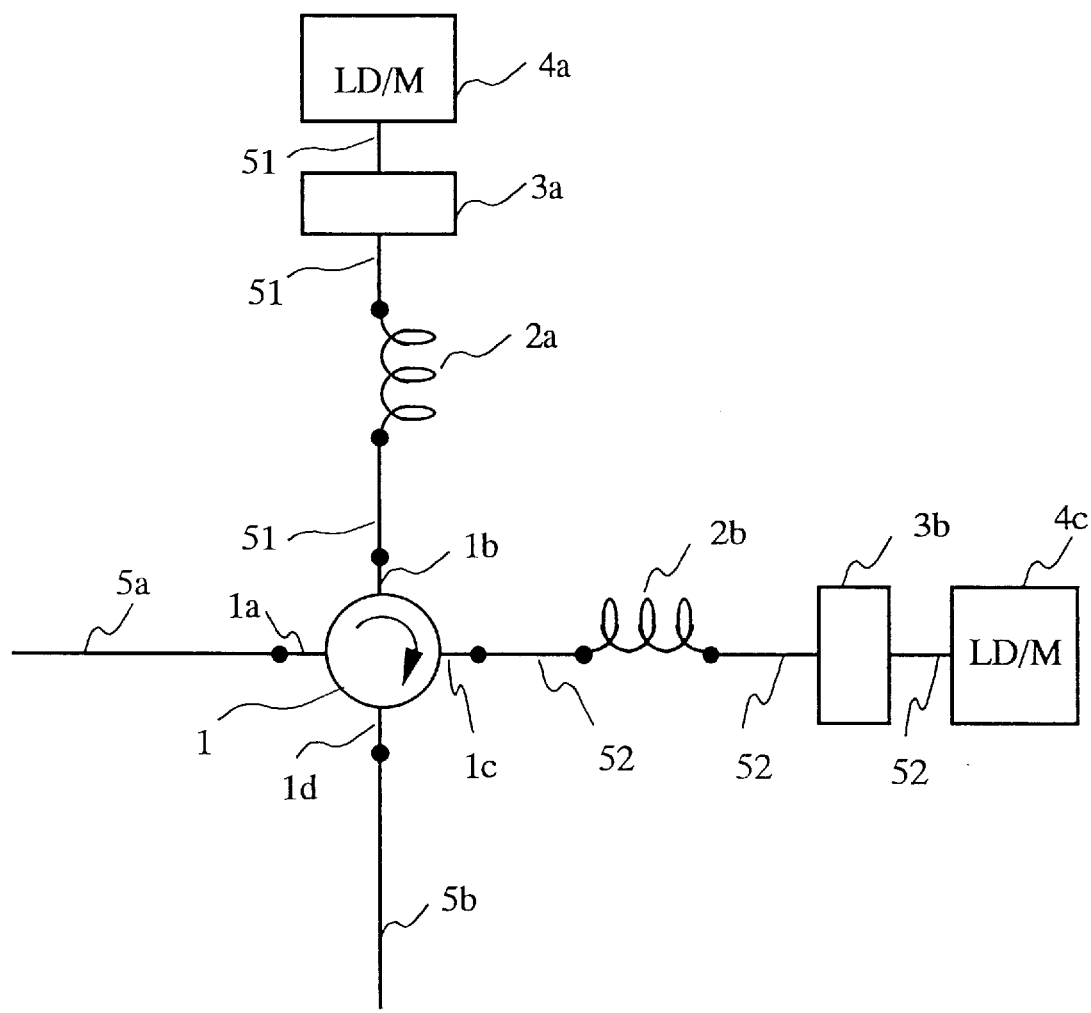
FIG. 1 shows a configuration of an optical amplifier of the present invention.

FIG. 1 shows a configuration of an optical amplifier of the present invention.

Figure 9:
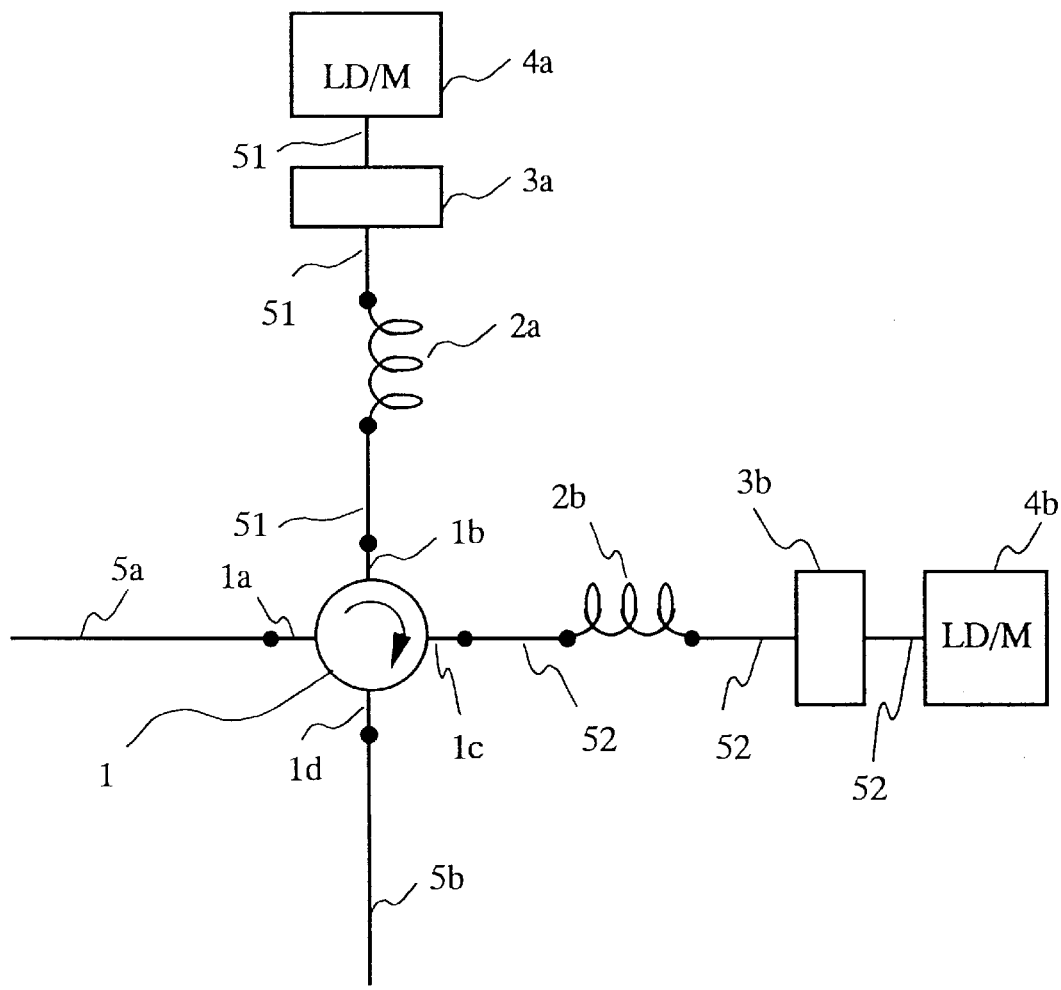
FIG. 9 shows a configuration of an optical amplifier of Related Art 1.

In FIG. 1, an LD/M 4c is connected to the terminal 1c and is 1.48 $\mu$m band LD/M (LD/M: laser diode module). The other reference numbers are equivalent to those already described in FIG. 9. In the optical amplifier of FIG. 1, a pump light whose wavelength of 0.98 $\mu$m is output from an LD/M 4a. A pump light whose wavelength is 1.48 $\mu$m is output from an LD/M 4c. A pump light whose wavelength is 0.98 $\mu$m realizes a lower noise amplification, compared to a case where light is amplified by a pump light whose wavelength is 1.48 $\mu$m. Therefore, the optical amplifier of the present invention amplifies the signal light according to the EDF 2a by using a pump light whose wavelength is 0.98 $\mu$m. After that, the signal light amplified by the EDF 2a is amplified according to the EDF 2b by using a pump light whose wavelength is 1.48 $\mu$m. By using pump light whose wavelength is 1.48 $\mu$m, a larger energy conversion efficiency than a case of a pump light whose wavelength is 0.98 $\mu$m can be achieved.

The operation for amplifying by inputting a signal light whose wavelength is 1.55 $\mu$m will now be described.

A basic operation is similar to that of an optical amplifier of Related Art 1. The EDF 2b is excited by a pump light of 1.48 $\mu$m. Therefore, when the wavelength of the signal light is 1.55 $\mu$m, an energy conversion efficiency is 1.48/1.55= 0.95 at its maximum. That is, energy conversion efficiency can be raised up to 95%. Based on this, energy conversion efficiency can be raised more than the optical amplifier of Related Art 1 excited only by using the value of 0.98 $\mu$m.

As has been described, since the first EDF 2a nearest to the input of the optical amplifier excites at 0.98 $\mu$m, low noise characteristic can be maintained. That is, an optical amplifier which causes low noise and offers high energy efficiency can be obtained.

An optical amplifier of FIG. 1 is a reflection type of optical amplifier using an optical circulator 1. Therefore, an input signal light goes back and forth in the EDF 2a and the EDF 2b. When the same gain as that of the cascade-connected 0.98/1.48 $\mu$m coexcitation type of optical fiber amplifier explained in Related Art 3 is required, the length of the EDF 2a and the EDF 2b can be halved. In the reflection type of optical amplifier of the present embodiment, the signal light goes back and forth between the EDFs. Therefore, the length of the EDF can be made half in order to obtain the same gain. The power of the pump light of 0.98 $\mu$m to maintain a low noise characteristic can be less. Accordingly, in order to gain the same performance, a ratio of the pump light power of 0.98 $\mu$m to that of 1.48 $\mu$m can be small. As a result, it is possible to raise the energy conversion efficiency higher than a case where cascade connection of Related Art 3 is used.

Embodiment 2

Figure 2:
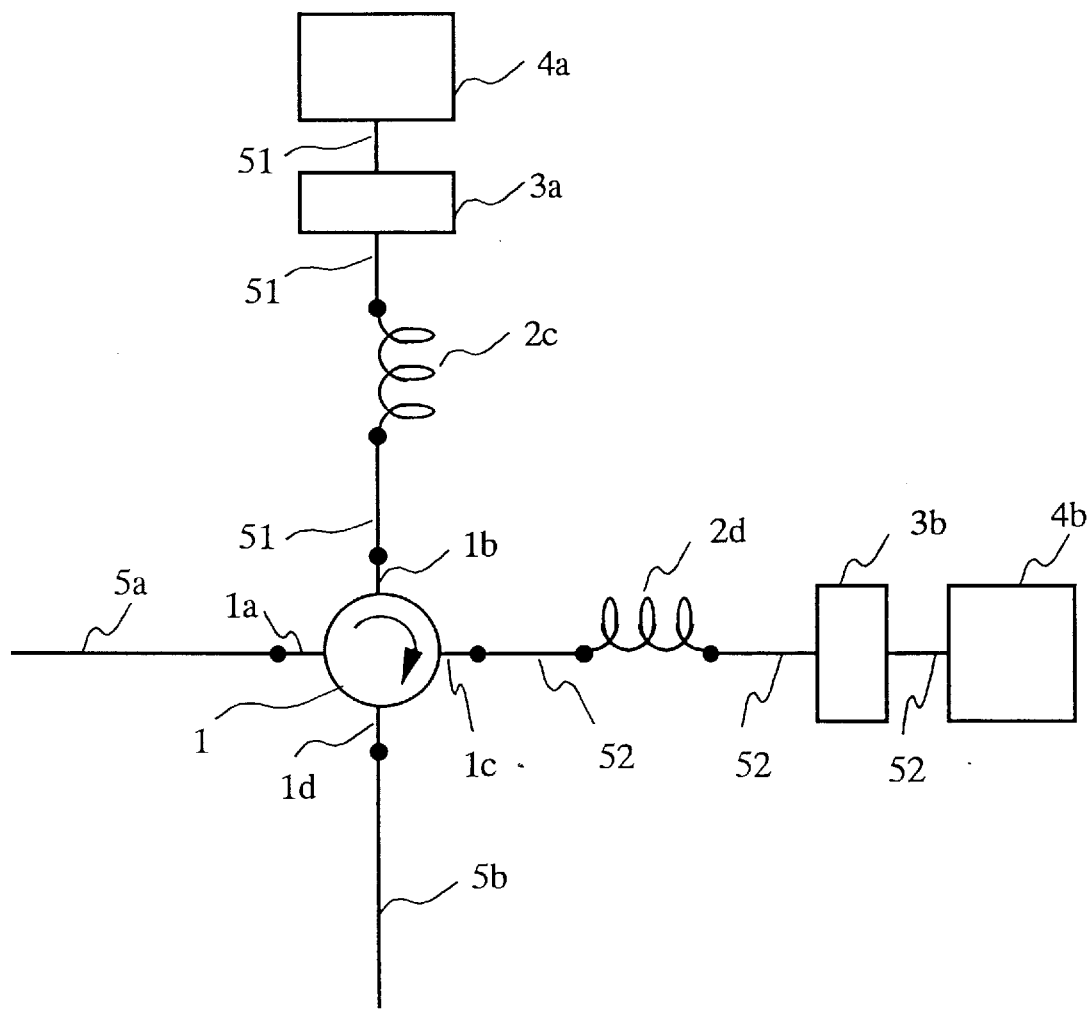
FIG. 2 shows another configuration of an optical amplifier of the present invention.

In FIG. 2, the EDF 2c and the EDF 2d are different kinds of EDF. For example, in the EDF 2c, aluminum oxide ($Al_2O_3$) is codoped in a core of the EDF. In the EDF 2d, aluminum oxide and phosphorus oxide ($Al_2O_3$—$P_2O_3$) is codoped in a core of the EDF. The other elements are equivalent to conventional ones of FIG. 9. The wavelength of the pump light supplied from the LD/M 4a and the LD/M 4b is assumed to be 0.98 $\mu$m. However, the wavelength supplied from the LD/M 4a and the LD/M 4b can be different from each other.

Figure 10:
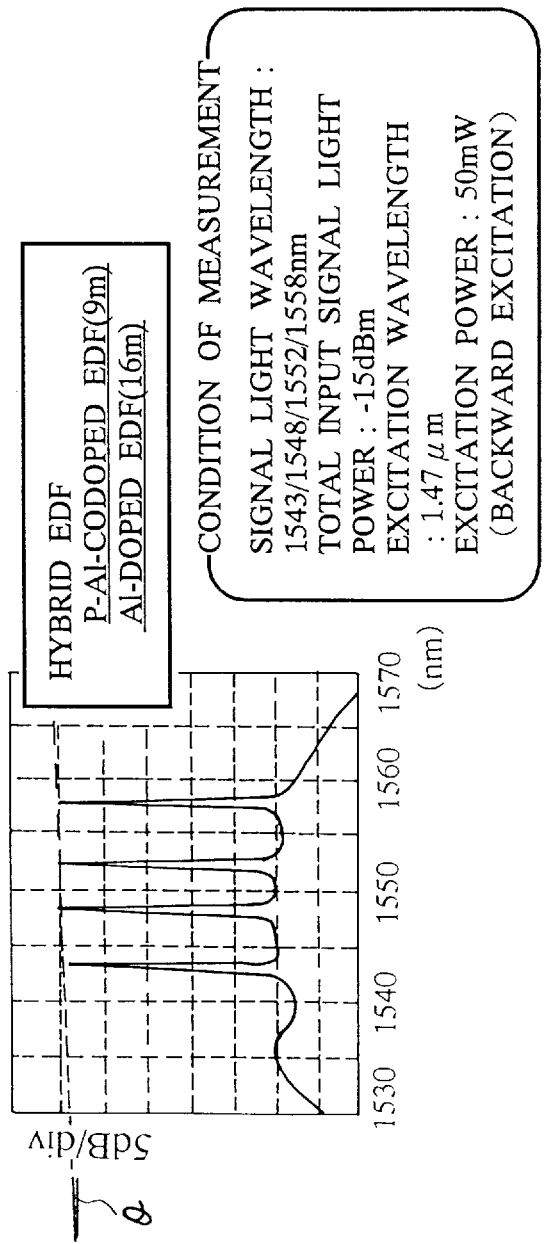
FIG. 10 shows a view of an output spectral of a hybrid EDF in which a P-Al-codoped EDF and Al-doped EDF in Related art 2 are cascade-connected.
Figure 11:
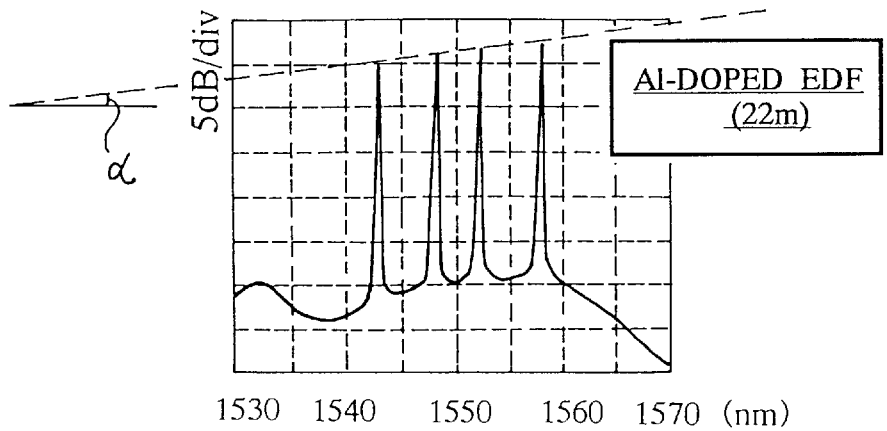
FIG. 11 shows a view of an output spectral at a time of a batch amplification of four waves of Al-doped EDF in Related art 2.
Figure 12:
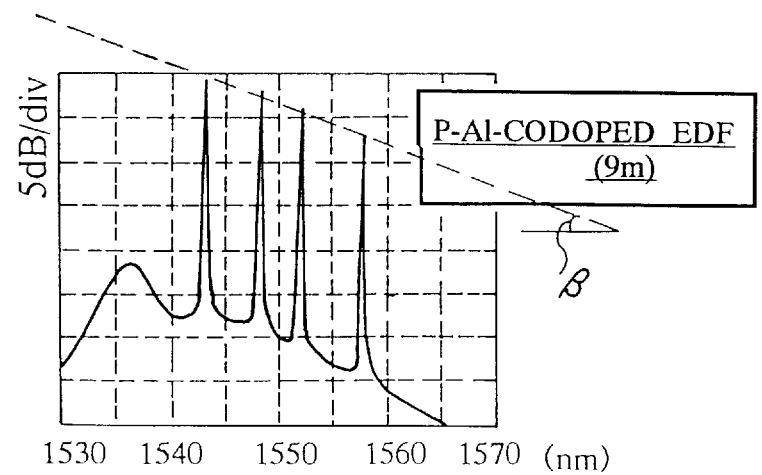
FIG. 12 shows a view of an output spectral at a time of a batch amplification of four waves of Al-doped EDF in Related art 2.
Figure 13:
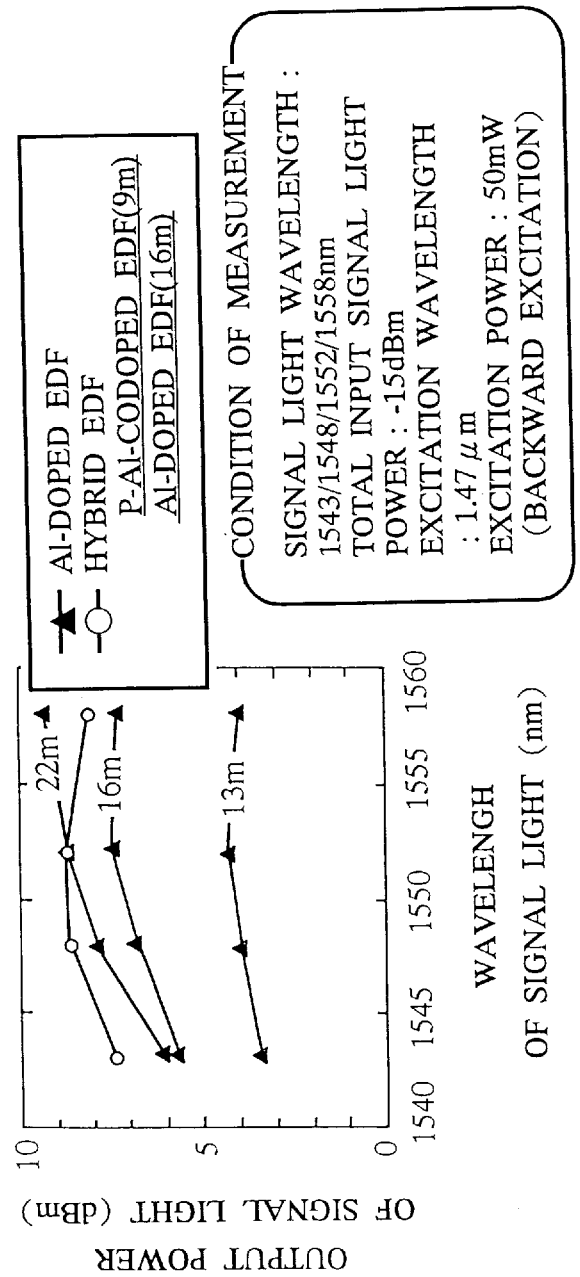
FIG. 13 shows a view of wave dependency of output of P-Al-codoped at a time of a batch amplification of four waves in Related Art 2.
Figure 14:
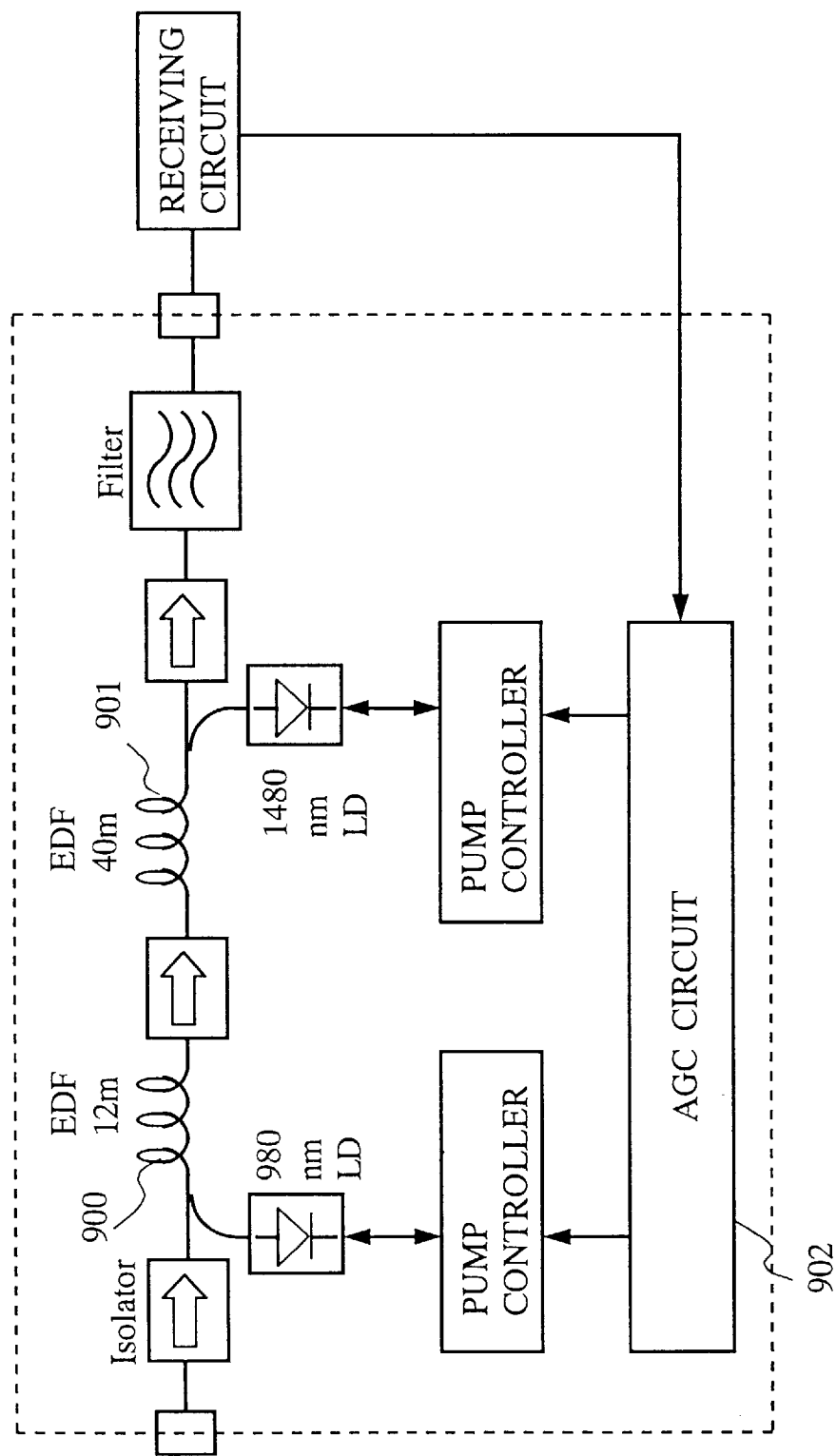
FIG. 14 shows a configuration of a light preamplifier in Related Art 3.

The basic operation of the optical amplifier of FIG. 2 is equal to that of FIG. 1. However, the wavelength dependency of gain of the EDF 2c and the EDF 2d is different from each other, as explained with reference to FIGS. 11 and 12 in Related Art 2. Hence, the EDF 2c and the EDF 2d are designed to compensate the wavelength dependency of gain each other for the input signal light. For example, in a range from 1543 nm to 1558 nm, it is possible to make gain spectrum flat. When the gain is flat, in a case where the signal light of wavelength of a certain range is input, the same gain is given to each signal light. For example, when the signal light of wavelength of a range from 1543 nm to 1558 nm is input, almost the same gain can be achieved as shown in FIG. 10. Therefore, it is possible not to cause unbalance of the output signal light.

In Related Art 2, a hybrid optical fiber amplifier according to cascade-connected Al/P-Al-codoped EDF was explained.

However, the optical amplifier of FIG. 2 is a reflection type of optical fiber amplifier and the signal light comes back and forth between the EDF 2c and the EDF 2d. In order to obtain the same gain as that of the optical amplifier of FIG. 2 by a hybrid optical fiber amplifier according to cascade-connected Al/P-Al-codoped EDF described in Related Art 2, the length of P-Al-codoped EDF and Al-doped EDF should be longer than the length of the EDF 2c and the EDF 2d. On the other hand, the length of the EDF 2c and the EDF 2d can be shorter than the fiber length of the hybrid optical fiber amplifier of Related Art 2, while obtaining the same gain.

The shorter the length of the EDF, the smaller the wavelength dependency of the gain. That is, the shorter the EDF, the flatter the gain, assuming the pump light power is stable. In the reflection type of optical amplifier, the signal light goes back and forth between the EDF. The length of the EDF can be half in order to obtain the same gain. Accordingly, the gain becomes flatter. That is, the wavelength dependency of the gain becomes small.

In the hybrid optical fiber amplifier, so that slope θ (FIG. 10) is made small, the length of the EDF should be adjusted in order to offset the slopes α (FIG. 11) and β (FIG. 12) of the different gains provided by the respective EDFs from each other. Since the slope of each EDF in the reflection type of optical amplifier is smaller than that of each EDF in the cascade-connected reflection type of optical amplifier, it is easier to perform length adjustment of the EDF in order to obtain the same flat gain. The easy adjustment brings a better reproductivity of the better flat gain as the result.

Embodiment 3

Figure 3:
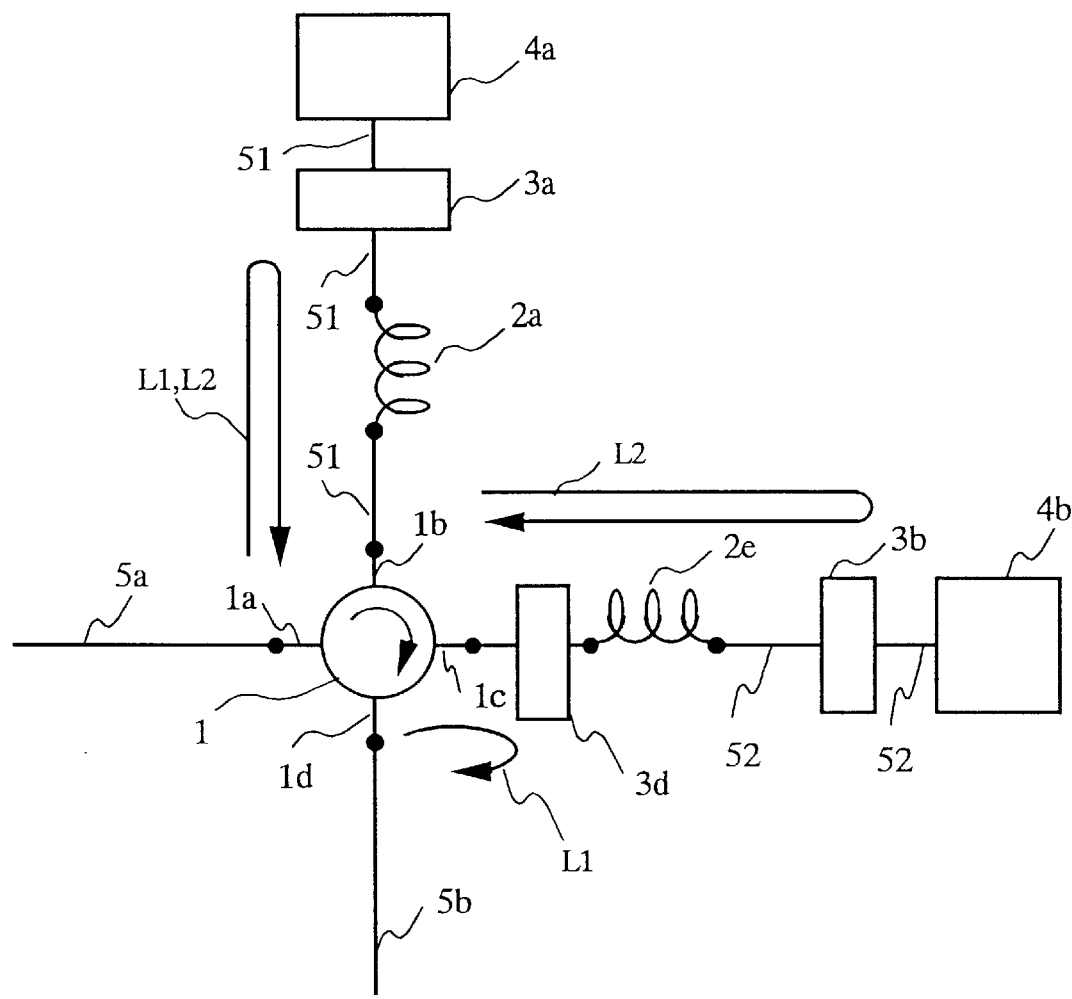
FIG. 3 shows an alternate configuration of an optical amplifier of the present invention.

In FIG. 3, an optical circulator 1 receives a first signal light L1 and a second signal light L2 having different wavelengths from a terminal 1a. An optical filter 3d connected to a terminal 1c reflects the first signal light L1 and passes the second signal light L2. Since to the optical filter 3d passes only the second signal light L2, an EDF 2e connected to the terminal 1c amplifies the second signal light L2. The other reference numbers are equivalent to those of FIG. 9 of Related Art 1 and the wavelength of the pump light supplied from the LD/M 4a and the LD/M 4b is assumed to be 0.98 μm. But, the wavelength of the pump light supplied from the LD/M 4a and the LD/M 4b can be different.

The basic operation of the optical amplifier shown in FIG. 3 is equivalent to that of Related Art 1. However, as has been described, the optical circulator 1 receives the first signal light L1 and the second signal light L2 of different wavelengths from the terminal 1a. For example, the wavelength of the first signal light L1 is assumed to be 1.55 μm and that of the second signal light L2 is assumed to be 1.56 μm. The wavelength of the first signal light L1 may be 1543 nm and that of the second signal light L2 may be 1552 nm as shown in FIG. 10. The signal lights L1 and L2 input from the terminal 1a are amplified by the EDF 2a initially. As to amplification according to the EDF 2a, more gain can be realized in the signal light L1 of wavelength of 1.55 μm than in the signal light L2 of wavelength of 1.56 μm. The reason that the gain increases with wavelength is explained, with reference to FIG. 16. In FIG. 16, the wavelength of a pump light is assumed to be 0.98 μm. The LD/M 4a of FIG. 3 outputs a pump light of wavelength of 0.98 μm to the EDF 2a. The LD/M 4b of FIG. 3 also outputs a pump light of wavelength of 0.98 μm to the EDF 2a. Comparing the light strength of the signal light whose wavelength is 1.55 μm and that of the signal light whose wavelength is 1.56 μm, as shown in FIG. 16, it is evident that the light strength of the signal light of 1.55 μm is larger than that of the signal light of 1.56 μm. Accordingly, in the EDF 2a, more gain is given to the signal light of 1.55 μm. According to FIG. 16, when the signal light whose wavelength is 1.55 μm is amplified by the EDF 2a, the gain is X, for example, in a case where the light strength of the signal light of the wavelength of 1.55 μm is assumed to be −50 dBm. In addition, when the signal light whose wavelength is 1.56 μm is amplified by the EDF 2a, the gain is Y, for example, in a case where the light strength of the signal light of the wavelength of 1.56 μm is assumed to be −50 dBm. The gain X is twice as much as the gain Y.

Since the optical filter 3d passes only the second signal light L2, the EDF 2e amplifies only the signal light of 1.56 μm. Hereby, the signal light of the wavelength of 1.56 μm is amplified by the gain Y according to each of the EDF 2a and the EDF 2e. As a result, almost the same gain with that of the signal light of the wavelength of 1.55 μm can be given. Accordingly, by using an optical amplifier having a configuration of FIG. 3, when the signal light having a different wavelength is input, it is possible to obtain almost the same gain based on the wavelength of the input signal light.

In an optical amplifier of FIG. 3, an optical filter 3d is set between the third terminal, the terminal 1c and the EDF 2e. However, the optical filter 3d can be set between the second terminal, the terminal 1b and the EDF 2a. Then, the optical filter 3d passes only the second signal light L2. At this time, the wavelength of the first signal light L1 is assumed to be 1.55 μm. The wavelength of the second signal light L2 is assumed to be 1.56 μm. Hereby, the EDF 2a amplifies only the signal light of the wavelength of 1.56 μm, the second signal light L2. The EDF 2e amplifies the signal light of the wavelength of 1.55 μm, the first signal light L1 and amplifies the signal light of the wavelength of 1.56 μm amplified by the EDF 2a again. Accordingly, the gain of the first signal light L1 and that of the second signal light L2 are almost the same.

As has been described, when the optical circulator 1 receives the first signal light L1 and the second signal light L2, which have different wavelengths, an optical filter for passing one of the signal lights is set at either of the second terminal or the third terminal. Hereby, it is possible to perform amplification so that the signal lights having different wavelengths have almost the same gain.

Embodiment 4

Figure 4:
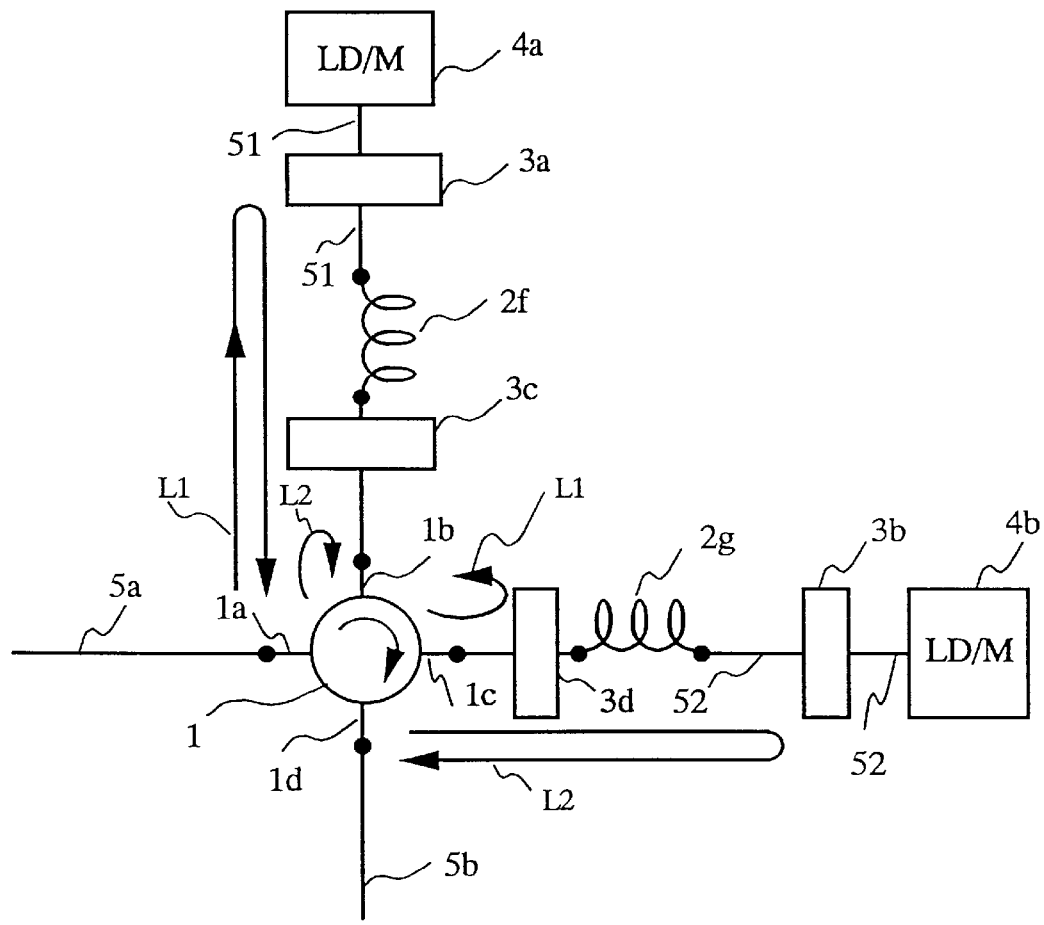
FIG. 4 shows yet another configuration of an optical amplifier of the present invention.

The optical circulator 1 of FIG. 4 receives the first signal light L1 and the second signal light L2 from the terminal 1a. The first signal light L1 and the second signal light L2 have different wavelengths. The optical filter 3c connected to the terminal 1b passes only the first signal light L1. The optical filter 3d connected to the terminal 1c passes only the second signal light L2. The second signal light L2 input from the terminal 1a is reflected by the optical filter 3c. Accordingly, the second signal light L2 will not be amplified by the EDF 2f. That is, the first signal light L1 input from the terminal 1a is amplified by the EDF 2f passing through the optical filter 3c. The second signal light L2 is amplified by the EDF 2g passing through the optical filter 3d. However, the first signal light L1 amplified by the EDF 2f is reflected by the optical filter 3d. Hence, it is not amplified by the EDF 2g. The other reference numbers are equivalent to those described in FIG. 9 of Related Arts. Both the LD/M 4a and the LD/M 4b supply a pump light having wavelength of 0.98 μm. Here, the LD/M 4a and the LD/M 4b can supply a pump light having a different wavelength from one another.

In an optical amplifier as shown in FIG. 4, the first signal light L1 input from the input terminal 1a gets amplified by the EDF 2c. The second signal light L2 gets amplified by the EDF 2e.

It is assumed that the EDF 2f and the EDF 2g as shown in FIG. 4 are the same kind of the EDF. Since the wavelength of the first signal light L1 and that of the second signal light L2 are different, the gain given to the first signal light L1 and the gain given to the second signal light L2 are different. That is, the gain of the output signal has variation according to the wavelength of the input signal light. However, by changing the kind of the EDF 2f and the EDF 2g, it is possible to reduce the variation of the gain caused by the wavelength of the input signal light. For example, by changing the diameter of the core of the EDF 2f and the EDF 2g, it is possible to change the gain. Furthermore, it is possible to change the gain by changing the density of erbium diffusion.

For example, the diameter of the core of the EDF 2g can be made larger than that of the core of the EDF 2f. Hereby, the EDF 2g can give more gain than the EDF 2f. In the optical amplifier whose diameter of the core is different, the first signal light L1 whose wavelength is 1.55 μm and the second signal light L2 whose wavelength is 1.56 μm are input. According to a graph shown in FIG. 16, the gain given by the pump light of 0.98 μm is X when the wavelength is 1.55 μm. When the wavelength is 1.56 μm, the gain given by the pump light of 0.98 μm is Y (X>Y). However, as stated above, the EDF 2f and the EDF 2g are designed so that the gain provided by the EDF 2g becomes more than the gain provided by the EDF 2f. Therefore, it is possible that the gain given to the signal light of the wavelength of 1.56 μm becomes X.

In the above description, the diameter of the core is made large. The gain may also be increased by increasing density of erbium diffusion. However, it is possible to change the gain by changing the power of pump light source 4a and 4b. In this case, the EDF 2f and the EDF 2g can be the same kind of the EDF.

For another example, it is possible to change the gain by changing the length of the EDF 2f and the EDF 2g. By setting the length of the EDF 2g longer than the length of the EDF 2f, it is possible to increase the gain of the EDF 2g more than that of the EDF 2f.

In FIGS. 1 to 4, the optical filter made of the dielectric multilayered film same with that of Related Art is used as the optical filters 3a, 3b, 3c, and 3d. However, the optical filter is not limited to this. Other types of optical filters, such as a fiber grating whose core has a diffraction grating, (a periodic distribution of refraction index of fine pitches provided in the core along the axis of the optical fiber is called a fiber grating. (cf. Optical Device Dictionary of Optronics Co., Ltd.)) can be used.

Embodiment 5

Figure 5:
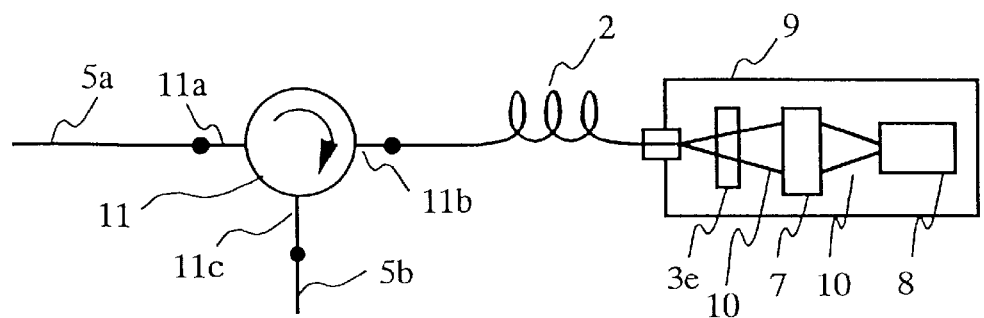
FIG. 5 shows another configuration of an optical amplifier of the present invention.

In FIG. 5, the optical circulator 11 is an optical circulator having three terminals (or, an optical circulator having four terminals using only three terminals among the four). An optical filter 3e is an optical filter made of dielectric multilayered film. A package 9 is composed of an optical filter 3e made of dielectric multilayered film, a lens 7 and a laser diode 8 of 0.98 μm band. A light beam 10 shows a transmission path of a pump light.

Figure 15:
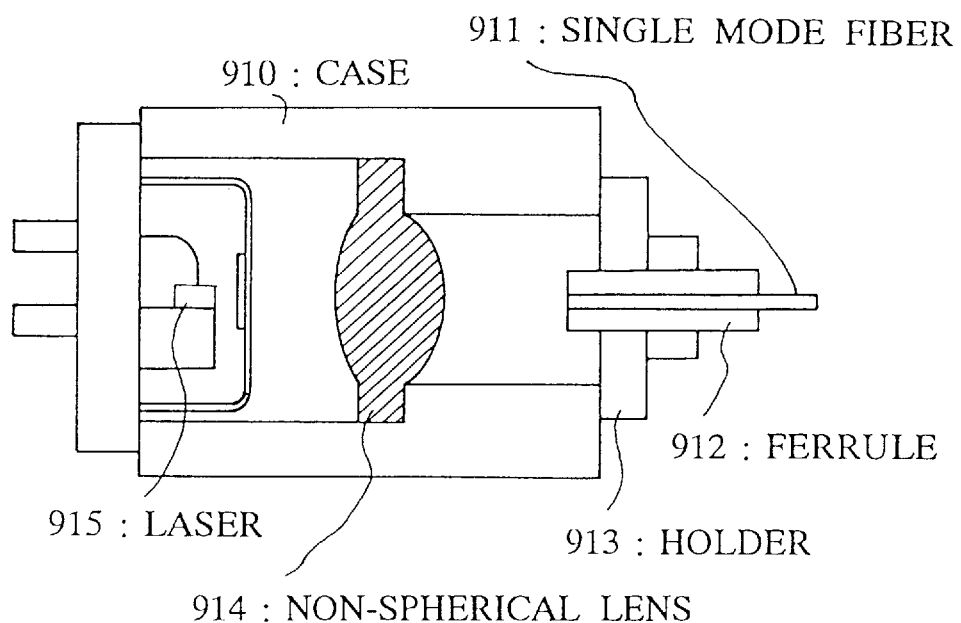
FIG. 15 shows a laser module using a non-spherical lens in Related Art 4.

A laser module using a non-spherical lens of FIG. 15 described in Related Art 4 does not integrate the optical filter. As shown in FIG. 5, the optical filter made of dielectric multilayered film for reflecting the signal light and having a mechanism of passing the pump light is provided in a light transmission path of the laser diode unit. Then, it is possible to realize a smaller optical amplifier in lighter weight than a conventional optical amplifier using a laser module having a configuration of FIG. 15 of Related Art 4.

In FIG. 5, an optical circulator having three terminals is described. However, it is possible to couple the package 9 to the optical circulator having four terminals as shown in FIG. 1. At this time, the package 9 is connected as a package 9a and a package 9b, respectively in the EDF 2h and the EDF 2i as shown in FIG. 6.

Embodiment 6

Figure 6:
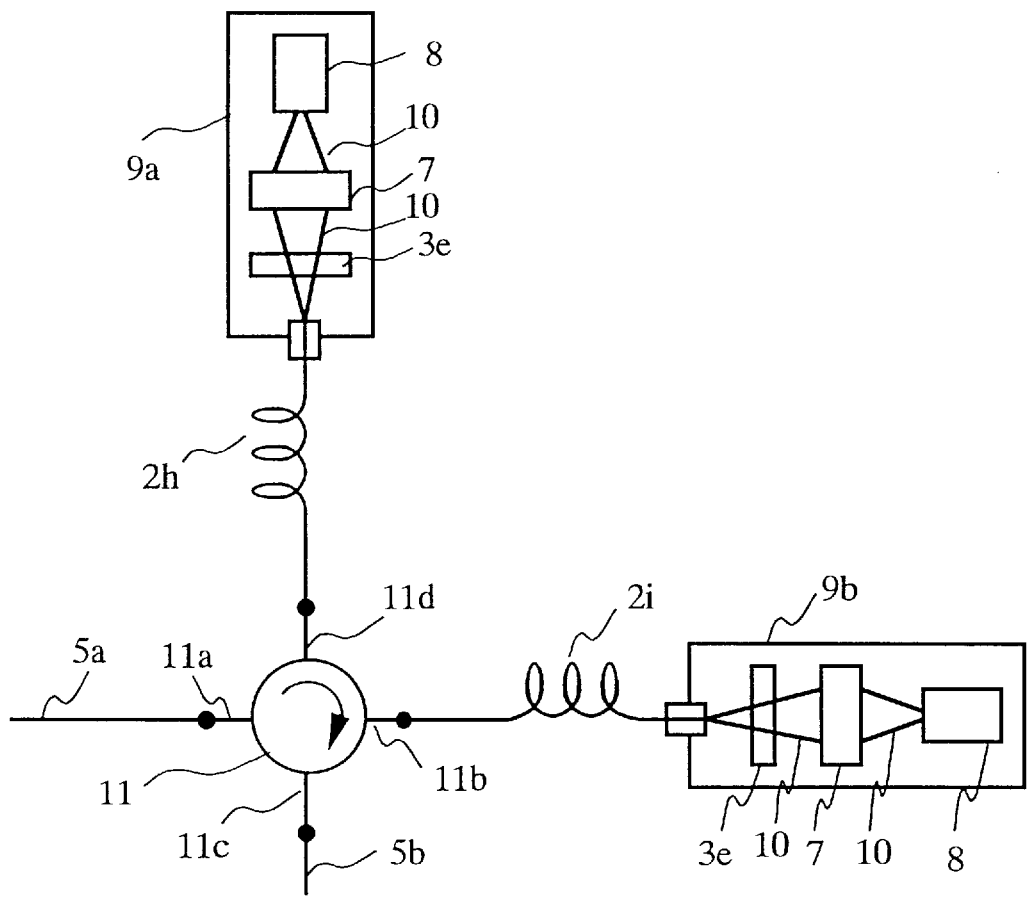
FIG. 6 shows a configuration of another optical amplifier of the present invention.
Figure 7:
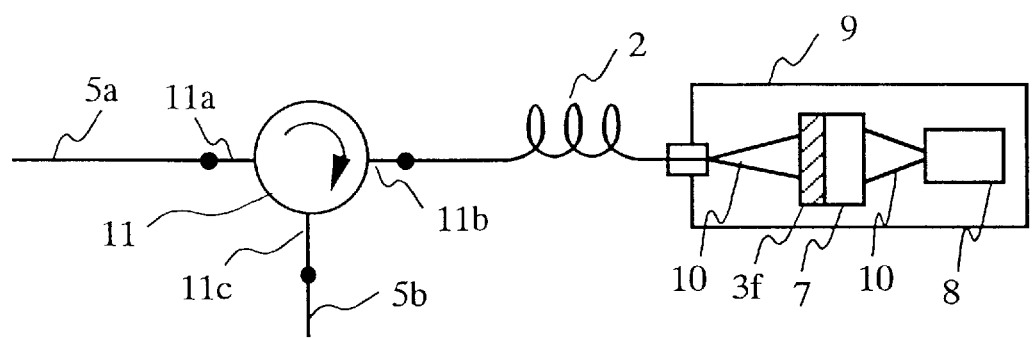
FIG. 7 shows another configuration of the optical amplifier in FIG. 6.

FIG. 7 shows an optical amplifier having a configuration as shown in FIG. 6. It has a optical filter 3f on a surface of the lens 7. The optical filter 3f is formed on the surface of the lens 7. As a result, it is possible to realize a simple optical amplifier having a fewer elements. Furthermore, it is possible to reduce the assembly process.

Figure 8:
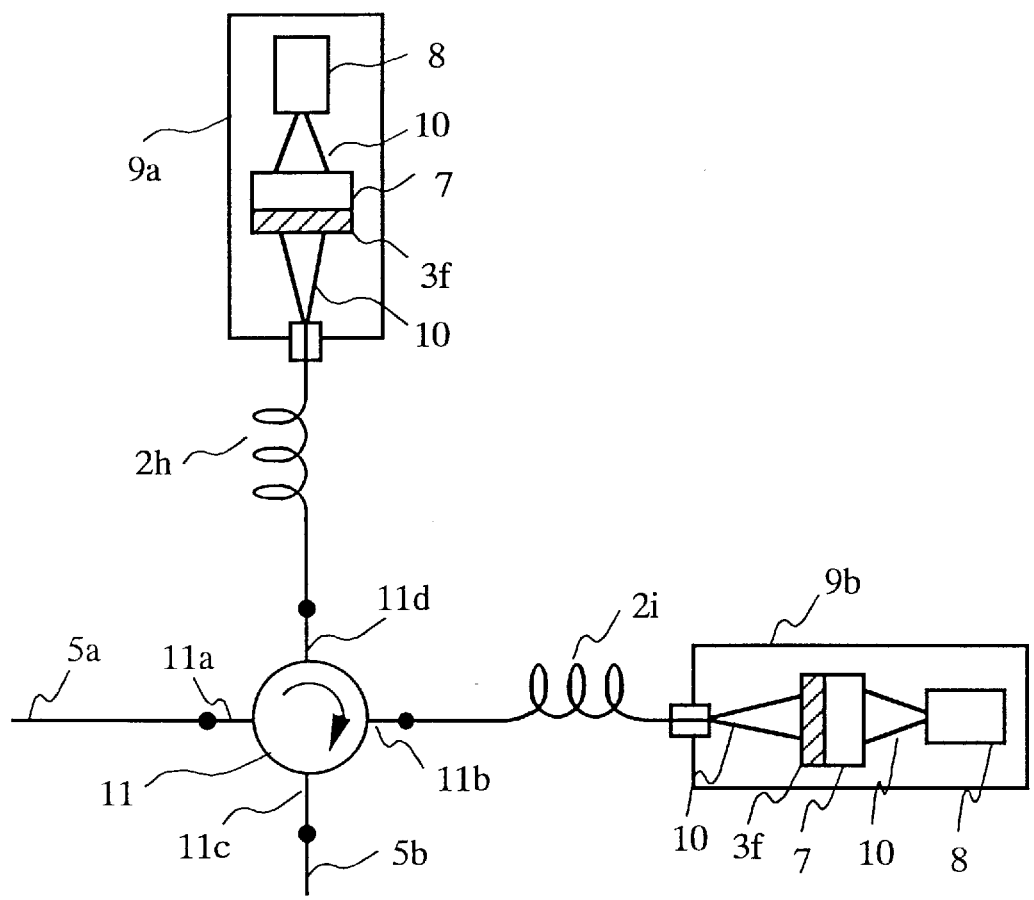
FIG. 8 shows yet another configuration of the optical amplifier in FIG. 6.

In FIG. 7, a case of an optical circulator having three terminals is shown and it is possible to couple the package 9 in the optical circulator having four terminals. At this time, the package 9 is connected as the package 9a and the package 9b, respectively to the EDF 2h and the EDF 2i as shown in FIG. 8.

Thus, the configurations of the present invention provide an efficient, wavelength independent, small optical amplifier. These various parameters are achieved in accordance with the present invention by the teachings provided by the example configurations discussed above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical amplifier comprising:
    (a) an optical transmitter having a first, a second, a third and a fourth terminals, and for transmitting light between each of the terminals;
    (b) a signal light inputter, connected to the first terminal of the optical transmitter, for supplying signal light;
    (c) a first light amplified fiber, connected to the second terminal of the optical transmitter, for amplifying the signal light input supplied from the signal light inputter;
    (d) a first pump light source for supplying a first pump light having a first excitation wavelength to the first light amplified fiber;
    (e) a first optical filter, connected between the first light amplified fiber and the first pump light source, for reflecting the signal light and passing the pump light;
    (f) a second amplified fiber, connected to the third terminal of the optical transmitter, for further amplifying the signal light amplified by the first light amplified fiber;
    (g) a second pump light source for supplying a second pump light having a second excitation wavelength different from the first excitation wavelength to the second light amplified fiber;
    (h) a second optical filter, connected between the second light amplified fiber and the second pump light source, for reflecting the signal light and passing the pump light; and
    (i) a signal light outputter, connected to the fourth terminal of the optical transmitter, for outputting the signal light.

2. The optical amplifier of claim 1, wherein a wavelength of the signal light is 1.5 μm, the first excitation wavelength is 0.98 μm and the second excitation wavelength is 1.48 μm.

3. An optical amplifier comprising:
    (a) an optical transmitter having a first, a second, a third and a fourth terminals and for transmitting light between each of the terminals;

(b) a signal light inputter, connected to the first terminal of the optical transmitter, for supplying signal light;

(c) a first light amplified fiber, connected to the second terminal of the optical transmitter, for amplifying the signal light supplied from the signal light inputter;

(d) a first pump light source for supplying pump light having a fixed wavelength light to the light fiber;

(e) a first optical filter, connected between the first light amplified fiber and the first pump light source, for reflecting the signal light and passing the pump light;

(f) a second light amplified fiber, connected to the third terminal of the optical transmitter, for amplifying the signal light amplified by the first light amplified fiber;

(g) a second pump light source for supplying pump light of a fixed wavelength to the second light amplified fiber;

(h) a second light filter connected between the second light amplified fiber and the second pump light source and for reflecting the signal light and transmitting the pump light; and (i) a signal light outputter connected to the fourth terminal of the optical transmitter and for outputting the signal light, wherein the fixed wavelength of the pump light supplied from the first pump light source is either the same as or different from the fixed wavelength of the pump light supplied from the second pump light source, and the signal light includes light having different wavelengths and wavelength dependency of gain obtained by amplifying the signal light with the first light amplified fiber and wavelength dependency of gain obtained by amplifying the signal light with the second light amplified fiber are compensated so that gain spectrum is made first.

4. An optical amplifier comprising:

(a) an optical transmitter having a first, a second, a third and a fourth terminals, and for transmitting light between each of the terminals;

(b) a signal light inputter, connected to the first terminal of the optical transmitter, for supplying signal light;

(c) a first light amplified fiber, connected to the second terminal of the optical transmitter, for amplifying the signal light supplied from the signal light inputter;

(d) a first pump light source for supplying pump light having a fixed wavelength light to the light fiber;

(e) a first optical filter, connected between the first light amplified fiber and the first pump light source, for reflecting the signal light and passing the pump light;

(f) a second light amplified fiber, connected to the third terminal of the optical transmitter, for amplifying the signal light amplified by the first light amplified fiber;

(g) a second pump light source for supplying pump light of the fixed wavelength to the second light amplified fiber;

(h) a second light filter, connected between the second light amplified fiber and the second pump light source and for reflecting the signal light and transmitting the pump light; and (i) a signal light outputter connected to the fourth terminal of the optical transmitter and for outputting the signal light, wherein the fixed wavelength of the pump light supplied from the first pump light source is either the same as or different from the fixed wavelength of the pump light supplied from the second pump light source, the signal light includes a first signal light and a second signal light having different wavelengths, and the optical amplifier further includes a third optical filter, connected at one of a position between the second terminal of the optical transmitter and the first light amplified fiber and a position between the third terminal of the optical transmitter and the second light amplified fiber, for transmitting one of the first signal light and the second signal light.

5. An optical amplifier comprising:

(a) an optical transmitter having a first, a second, a third and a fourth terminals and for transmitting light between each of the terminals;

(b) a signal light inputter, connected to the first terminal of the optical transmitter, for supplying signal light;

(c) a first light amplified fiber, connected to the second terminal of the optical transmitter, for amplifying the signal light supplied from the signal light inputter;

(d) a first pump light source for supplying pump light having a fixed wavelength light to the light fiber;

(e) a first optical filter, connected between the first light amplified fiber and the first pump light source, for reflecting the signal light and passing the pump light;

(f) a second light amplified fiber, connected to the third terminal of the optical transmitter, for amplifying the signal light amplified by the first light amplified fiber;

(g) a second pump light source for supplying pump light of the fixed wavelength to the second light amplified fiber;

(h) a second light filter connected between the second light amplified fiber and the second pump light source and for reflecting the signal light and transmitting the pump light; and (i) a signal light outputter connected to the fourth terminal of the optical transmitter and for outputting the signal light, wherein the fixed wavelength of the pump light supplied from the first pump light source is either the same as or different from the fixed wavelength of the pump light supplied from the second pump light source, the signal light includes a first signal light and a second signal light having different wavelengths, and the optical amplifier further includes, a third optical filter, connected between the second terminal of the optical transmitter and the first light amplified fiber, for passing one of the first signal light and the second signal light, and a fourth optical filter, connected between the third terminal of the optical transmitter and the second light amplified fiber, for passing the second signal light when the third optical filter passes the first signal light and for passing the first signal light when the third optical filter passes the second signal light.

6. An optical transmitter comprising:

an optical amplifier having at least a first, a second and a third terminal and for transmitting the signal light between each of the terminals;

a signal light inputter, connected to the first terminal, for supplying signal light;

a light amplified fiber, connected to the second terminal, for inputting, amplifying and outputting the signal light;

a pump light source for generating a pump light to supply the optical amplifier; and a light focusing part for focusing the generated pump light on the light amplified fiber; and an optical filter, connected between the light amplified fiber and the light connecting part, for reflecting the signal light and for passing the pump light, wherein the fixed wavelength of the pump light supplied from the first pump light source is either the same as or different from the fixed wavelength of the pump light supplied from the second pump light source, and at least two of the optical filter, the light focusing part, and the pump light source are mounted together.

7. The optical amplifier of claim 6, wherein the light focusing part and the optical filter are mounted together.

8. The optical amplifier of claim 1, wherein the optical filter is a dielectric multilayer film.

9. The optical amplifier of claim 1, wherein at least one of the first and second light amplified fibers has a core and the corresponding optical filter is a diffraction grating formed on the core.

10. The optical amplifier of claim 3, wherein the gain spectrum is made flat by forming the first light amplified fiber from a different material than the second light amplified fiber.

11. The optical amplifier of claim 5, wherein the first light amplified fiber has a different length than the second light amplified fiber.

12. The optical amplifier of claim 5, wherein the first light amplified fiber has a different core diameter than the second light amplified fiber.

13. The optical amplifier of claim 5, wherein the first light amplified fiber has a different dopant density than the second light amplified fiber.

14. The optical amplifier of claim 5, wherein the first pump light source has a different power than the second pump light source.

15. The optical amplifier of claim 1, wherein the signal light includes light of differing wavelengths.

* * * * *